(12) United States Patent
Ertas

(10) Patent No.: US 10,815,831 B2
(45) Date of Patent: Oct. 27, 2020

(54) BEARING SUPPORT INCLUDING HERMETIC SQUEEZE FILM DAMPER AND ACCUMULATOR VOLUME

(71) Applicant: General Electric Company, Schenectady, NY (US)

(72) Inventor: Bugra Han Ertas, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/504,240

(22) Filed: Jul. 6, 2019

(65) Prior Publication Data

US 2020/0191016 A1    Jun. 18, 2020

Related U.S. Application Data

(60) Provisional application No. 62/780,945, filed on Dec. 18, 2018.

(51) Int. Cl.
*F01D 25/16* (2006.01)
*F16F 15/023* (2006.01)
*F16C 32/06* (2006.01)

(52) U.S. Cl.
CPC ........ *F01D 25/164* (2013.01); *F16C 32/0666* (2013.01); *F16C 32/0677* (2013.01);
(Continued)

(58) Field of Classification Search
CPC .............. F16C 32/0614; F16C 32/0666; F16C 33/1005; F16C 2360/23; F16F 15/0237;
(Continued)

(56) References Cited

U.S. PATENT DOCUMENTS 4,638,895 A    1/1987  Taylor et al.
4,693,616 A    9/1987  Rohra et al.
(Continued)

FOREIGN PATENT DOCUMENTS

CN    102062145 A    5/2011
CN    104358820 B    3/2016
(Continued)

OTHER PUBLICATIONS

E. J. Gunter et al., "Stabilization of Turbomachinery with Squeeze Film Dampers—Theory and Applications", pp. 01-10, Jun. 18, 1976.
(Continued)

*Primary Examiner* — Marcus Charles
(74) *Attorney, Agent, or Firm* — Paul Diconza

(57) ABSTRACT

Embodiments of a frequency independent damper assembly are disclosed. In some embodiments, the damper assembly includes a damper housing, a damper plunger and a support spring. The damper plunger is disposed at least partially within the housing and movable within to define a first primary damper cavity and a second primary damper cavity. The support spring includes a plurality of flexible elements coupled to the damper housing and disposed radially outward of the first primary damper cavity and the second primary damper cavity. The support spring defines a first accumulator cavity and a second accumulator cavity. A flow-through channel couples the first accumulator cavity to the second accumulator cavity. A gas bearing including the frequency independent damper assembly is disclosed.

20 Claims, 7 Drawing Sheets

(52) U.S. Cl.
CPC ...... *F16F 15/0237* (2013.01); *F05D 2240/53* (2013.01); *F16C 2360/23* (2013.01)

(58) Field of Classification Search
CPC ...... F01D 25/164; F01D 25/186; F01D 25/22; F05D 2240/50
USPC .......................... 384/99, 103, 109, 117, 627
See application file for complete search history.

(56) References Cited

U.S. PATENT DOCUMENTS

| | | | |
|---|---|---|---|
| 4,768,627 | A | 9/1988 | Taylor |
| 5,487,454 | A | 1/1996 | Klembczyk et al. |
| 6,196,721 | B1 | 3/2001 | Farkaly |
| 6,216,831 | B1 | 4/2001 | Taylor |
| 6,345,707 | B1 | 2/2002 | Klembczyk |
| 7,374,342 | B2 | 5/2008 | Yum et al. |
| 7,492,069 | B2 | 2/2009 | Knox et al. |
| 7,517,152 | B1 | 4/2009 | Walsh |
| 7,625,121 | B2 | 12/2009 | Pettinato et al. |
| 9,121,448 | B2 | 9/2015 | Delgado et al. |
| 9,416,820 | B2 | 8/2016 | Ertas et al. |
| 9,429,191 | B2 | 8/2016 | Ertas et al. |
| 9,746,029 | B1 | 8/2017 | Mook et al. |
| 9,777,766 | B1 | 10/2017 | Bischof et al. |
| 10,001,166 | B2 | 9/2018 | Ertas et al. |
| 10,066,505 | B2 | 9/2018 | Ertas et al. |
| 2013/0280064 | A1* | 10/2013 | van Steinvoren ....... F03D 13/35 416/1 |
| 2015/0104124 | A1* | 4/2015 | Delgado Marquez ...................... F16C 27/045 384/119 |
| 2016/0169281 | A1* | 6/2016 | Ertas ................... F16C 32/0662 384/119 |
| 2017/0010025 | A1* | 1/2017 | Mayershofer ....... F04B 53/1082 |
| 2017/0298773 | A1* | 10/2017 | Ertas ....................... F01D 25/16 |
| 2017/0370364 | A1* | 12/2017 | Gu ........................ F04D 29/056 |
| 2019/0032477 | A1 | 1/2019 | Huang |

FOREIGN PATENT DOCUMENTS

| | | | | |
|---|---|---|---|---|
| CN | 107893814 A | * | 4/2018 | .......... F16C 32/0603 |
| EP | 3112691 A1 | * | 1/2017 | .......... F04D 29/046 |
| JP | 6409061 B2 | * | 10/2018 | .......... F16C 32/0677 |
| WO | WO-2010103313 A1 | * | 9/2010 | .......... F16F 15/0237 |
| WO | 2017091523 A1 | | 6/2017 | |
| WO | WO-2017184411 A1 | * | 10/2017 | ................ F02C 7/06 |
| WO | WO-2017207411 A1 | * | 12/2017 | .......... F04D 29/0413 |

OTHER PUBLICATIONS

Jianming Cao et al., "Nonlinear Modeling of Tilting-pad Bearings with Squeeze Film Dampers and Application to Flexible Rotor Analysis", Journal of Engineering Research and Application, vol. 07, Issue: 10, pp. 51-68, Oct. 2017.

Bugra Ertas et al., "Hermetically Sealed Squeeze Film Damper for Operation in Oil-free Environments", Journal of Engineering for Gas Turbines and Power, vol. 141, Issue: 2, pp. 01-09, Oct. 15, 2018.

Thanh et al., "An Application of the Novel Linear Magnetic Actuator to Controllable Squeeze Film Damper", 2008 International Conference on Smart Manufacturing Application, pp. 276-281, Gyeonggi-do, 2008.

Zhang et al., "Dynamical characteristics research on the squeezed film damper stiffness rotor", 2012 Symposium on Piezoelectricity, Acoustic Waves, and Device Applications (SPAWDA), pp. 438-442, Shanghai, 2012.

\* cited by examiner

BEARING SUPPORT INCLUDING HERMETIC SQUEEZE FILM DAMPER AND ACCUMULATOR VOLUME

BACKGROUND

The field of the disclosure relates generally to gas bearing assemblies, and more particularly, to gas bearings having frequency independent bearing support assemblies.

Conventional turbomachines possess rotor assemblies that include shafts, compressor impellers, turbines, couplings, sealing packs and other elements required for optimal operation under given operating conditions. These rotor assemblies have a mass generating a constant static force due to gravity, and also generate a dynamic force due to imbalances in the rotor assembly during operation. Other static forces can be generated from geared turbomachinery. Such turbomachines include bearings to sustain and support these forces while permitting rotation of the rotor assembly.

At least some known rotary machines use gas bearings where a non-oil lubricated bearing is desired. A typical non-oil lubricated bearing, and more specifically, a gas bearing includes a bearing support including hermetic squeeze film dampers (HSFD). More specifically, the HSFDs are intended to work in an air bearing system damping vibrations and enabling stable operation of the rotor system at high speeds.

A typical additively built gas bearing with HSFD possesses a pad central post that creates an annular clearance with a hair-pin support structure. On the top and bottom of the annular clearance there are two opposing fluidic volumes, bounded and defined by annular flexible members, that behave in a reciprocating manner when vibration is imposed on an associated bearing pad system. The mechanism of damping that is generated in the bearing support is generated from pressure driven Poiselle flow, which is a function of volumetric displacement of the opposing fluidic volumes and vibratory velocity.

However, the inventor has observed that some HSFD, that have been adapted for use in full-scale turbomachinery, typically are frequency dependent and do not work as desired. More particularly, known bearing support designs include two flexible elements that make up the bearing support spring (stiffness, K). These two flexible elements "bound" the primary damper cavity fluid volume where high dynamic pressures are generated. Dynamic pressures due to the "pushing" of the damper fluid during vibration not only provide viscous dissipation at the damper restriction but also deform the flexible elements. The deformation of the flexible elements due to pressure, creates unwanted and undesirable volume changes in the primary damper cavity.

In known damper assemblies, the bearing support has a very strong frequency dependency both for stiffness and damping. Not only does the stiffness increase in the bearing support as vibratory frequency is increased, but the damping coefficient decreases with increasing frequency of vibration. This is not desirable because increasing the stiffness coefficient in the bearing support will reduce the equivalent damping of the bearing system (takes into account gas film+bearing support). In other words, if the stiffness in the bearing support is large then the majority of the vibratory motion and energy dissipation resides in the gas film, where the damping is very poor.

Therefore, the inventors have provided an improved gas bearing including a novel frequency independent HSFD bearing support.

BRIEF DESCRIPTION

Aspects and advantages of the disclosure are set forth below in the following description, or may be obvious from the description, or may be learned through practice of the disclosure.

In one aspect, a frequency independent damper assembly of a gas bearing is provided. The frequency independent damper assembly includes a damper housing, a damper plunger disposed at least partially within the housing, a support spring including a plurality of flexible elements coupled to the damper housing and defining an accumulator volume. The damper plunger is movable within the housing to define a first primary damper cavity and a second primary damper cavity. The flexible elements are disposed radially outward of the first primary damper cavity and a second primary damper cavity. The support spring defines a first accumulator cavity and a second accumulator cavity. The frequency independent damper assembly further comprising at least one flow-through channel coupling the first accumulator cavity to the second accumulator cavity.

In another aspect, a bearing is provided. The bearing includes an outer rim, a housing and a frequency independent damper assembly. The frequency independent damper assembly includes a damper housing, a damper plunger disposed at least partially within the housing, a support spring including a plurality of flexible elements coupled to the damper housing and defining an accumulator volume and a non-restrictive flow-through channel. The damper plunger is movable within the housing to define a first primary damper cavity and a second primary damper cavity. The flexible elements are disposed radially outward of the first primary damper cavity and a second primary damper cavity. The support spring defines a first accumulator cavity and a second accumulator cavity. The non-restrictive flow-through channel couples the first accumulator cavity to the second accumulator cavity.

In yet another aspect, a bearing is provided. The bearing includes an outer rim, a housing and a frequency independent damper assembly. The frequency independent damper assembly including a damper housing, a damper plunger disposed at least partially within the housing, a support spring including a plurality of flexible elements coupled to the damper housing and defining an accumulator volume, a non-restrictive flow-through channel and a plurality of restrictive clearances. The damper plunger is movable within the housing to define a first primary damper cavity and a second primary damper cavity. The first primary damper cavity and the second primary damper cavity are in fluid communication via a primary damper cavity clearance. The flexible elements are disposed radially outward of the first primary damper cavity and a second primary damper cavity, the support spring defining a first accumulator cavity and a second accumulator cavity. The non-restrictive flow-through channel couples the first accumulator cavity to the second accumulator cavity. The plurality of restrictive clearances fluidically decouple the first accumulator cavity and the second accumulator cavity from the first primary damper cavity and the second primary damper cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Figure 1:
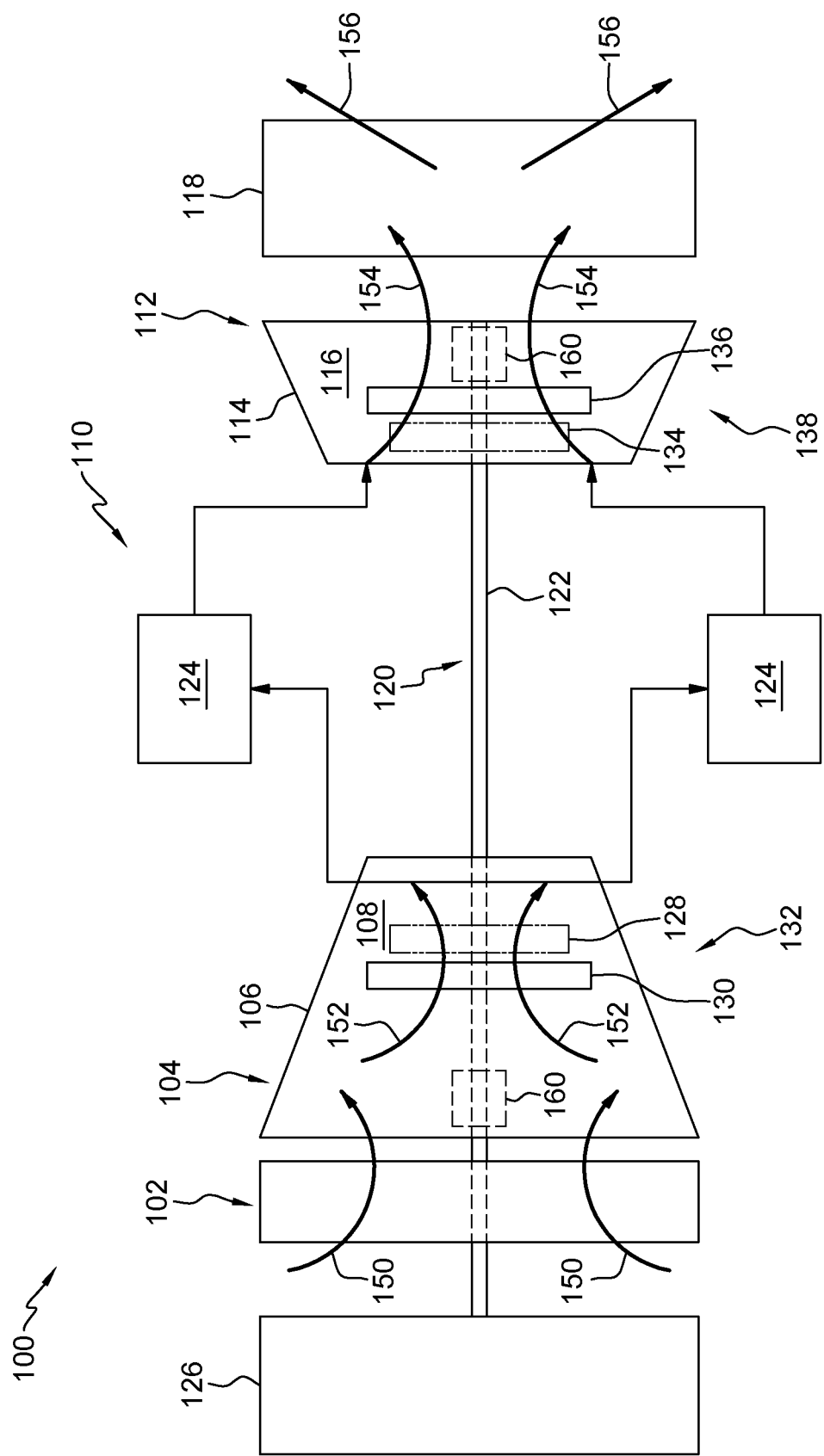
FIG. 1 is a schematic view of a rotary machine, in accordance with one or more embodiments of the present disclosure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. Corresponding reference characters indicate corresponding parts throughout the several views of the drawings.

DETAILED DESCRIPTION OF THE DISCLOSURE

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide for a bearing including frequency independent HSFD assemblies, also referred to herein as bearing supports, as compared to conventional frequency dependent gas bearings. In at least some embodiments, the inventive bearing provides a high-performance fluid damper assembly with a hydrostatically pressurized compliant bearing pad. Moreover, the frequency independent damper assemblies include a hermetic squeeze film damper that not only possesses a first, or upper, primary damper cavity and second, or lower, primary damper cavity, but also includes accumulator volumes, including a pass-through channel and the flexible elements of the system.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

The inventors have observed that the damper assemblies in conventional gas bearings are typically frequency dependent. More particularly, in a gas bearing system there are included two mechanical elements in series: (i) a gas film represented by a stiffness (K) and damping (C) coefficient; and (ii) in series with the gas film, there is the bearing support, also referred to herein as the damper assembly. The damper assembly, is comprised of a fluidic damper and a support spring (flexible elements). The bearing support spring and the damper have their own stiffness (K) and damping (C) coefficients. Under ideal engineering conditions or ideal bearing support design, the bearing support spring and the damper would not be frequency dependent, and more particularly the stiffness coefficient (K) would only be static and the damping (C) coefficient would not change with frequency.

Accordingly, disclosed is HSFD architecture that uses several design concepts in combination to yield a novel damper design for a bearing. On a high level, the concept uses a series of fluidic cavities connected through carefully controlled restrictive clearances, where the cavity volumes are modulated through externally imposed vibratory motion. The vibratory motion creates a recirculating fluid flow through the cavities and restrictions to generate robust levels of viscous damping. The novel design renders the stiffness and damping coefficients to be frequency independent. To provide such, the design locates flexible members outside of the high-pressure zones of the primary damper cavities and moves the flexible elements to accumulator cavities connected by a non-restrictive pass-through channel. This unique configuration yields a frequency independent damper.

Referring now to FIG. 1, illustrated is a schematic view of a rotary machine, i.e., a turbomachine 100, and more specifically, a non-oil lubricated turbine engine. In the exemplary embodiment, the turbine engine is a gas turbine engine. Alternatively, the turbomachine 100 is any other turbine engine and/or turbomachine, including, without limitation, a steam turbine engine, a centrifugal compressor, and a turbocharger. In the exemplary embodiment, the turbomachine 100 includes an air intake section 102, and a compressor section 104 that is coupled downstream from, and in flow communication with, the intake section 102. The compressor section 104 is enclosed within a compressor casing 106 defining a compressor chamber 108. A combustor section 110 is coupled downstream from, and in flow communication with, the compressor section 104, and a turbine section 112 is coupled downstream from, and in flow communication with, the combustor section 110. The turbine section 112 is enclosed within a turbine casing 114 defining a turbine chamber 116. An exhaust section 118 is provided downstream from the turbine section 112. Moreover, in the exemplary embodiment, the turbine section 112 is coupled to the compressor section 104 via a rotor assembly 120 including a drive shaft 122. The drive shaft 122 is rotationally supported by one or more bearing assemblies, for example, gas bearing or journal bearing assemblies (shown at multiple positions in accordance with one or more embodiments at 160) located within the compressor casing 106 and the turbine casing 114.

In the exemplary embodiment, the combustor section 110 includes a plurality of combustor assemblies, i.e., the combustors 124 that are each coupled in flow communication with the compressor section 104. Moreover, in the exemplary embodiment, the turbine section 112 and the compressor section 104 are rotatably coupled to a load 126 via the drive shaft 122. For example, the load 126 may include, without limitation, an electrical generator and/or a mechanical drive application, e.g., a pump, a propeller, fan, rotor, or the like. In some embodiments, the turbomachine 100 may be an aircraft engine.

Also, in the exemplary embodiment, the compressor section 104 includes at least one compressor blade assembly 128 and at least one optional adjacent stationary vane assembly 130. Each combination of the compressor blade assembly 128 and adjacent stationary vane assembly defines a compressor stage 132. Also, each compressor blade assembly 128 includes a plurality of compressor blades (not shown in FIG. 1) and each stationary vane assembly 130 includes a plurality of compressor vanes (not shown in FIG. 1). Furthermore, each compressor blade assembly 128 is removably coupled to the drive shaft 122 and each stationary vane assembly 130 is removably coupled to, and supported by, the compressor casing 106.

Further, in the exemplary embodiment, the turbine section 112 includes at least one turbine blade assembly 134 and at least one adjacent stationary nozzle assembly 136. Each combination of turbine blade assembly 134 and adjacent stationary nozzle assembly 136 defines a turbine stage 138. Also, each turbine blade assembly 134 is removably coupled to the drive shaft 122 and each stationary nozzle assembly 136 is removably coupled to, and supported by, the turbine casing 114.

In operation, the air intake section 102 channels air 150 towards the compressor section 104. The compressor section 104 compresses the inlet air 150 to higher pressures and temperatures prior to discharging a compressed air 152 towards the combustor section 110. The compressed air 152 is channeled to a fuel nozzle assembly (not shown), mixed with fuel (not shown), and burned within each combustor 124 to generate combustion gases 154 that are channeled downstream towards the turbine section 112. The combustion gases 154 generated within the combustors 124 are channeled downstream towards the turbine section 112.

Figure 2:
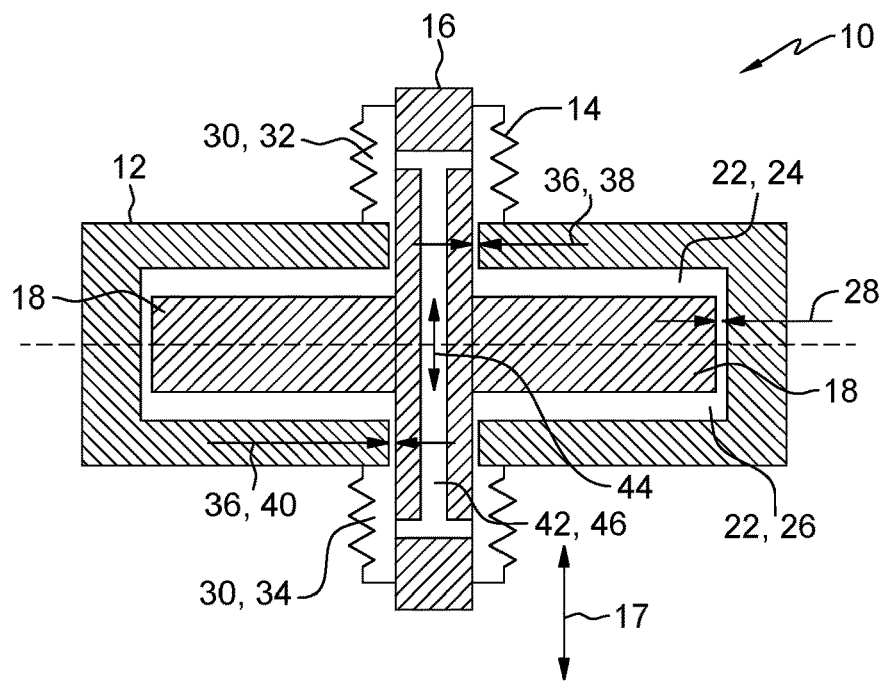
FIG. 2 is a schematic cross-section of a frequency independent HSFD, in accordance with one or more embodiments of the present disclosure.
Figure 3:
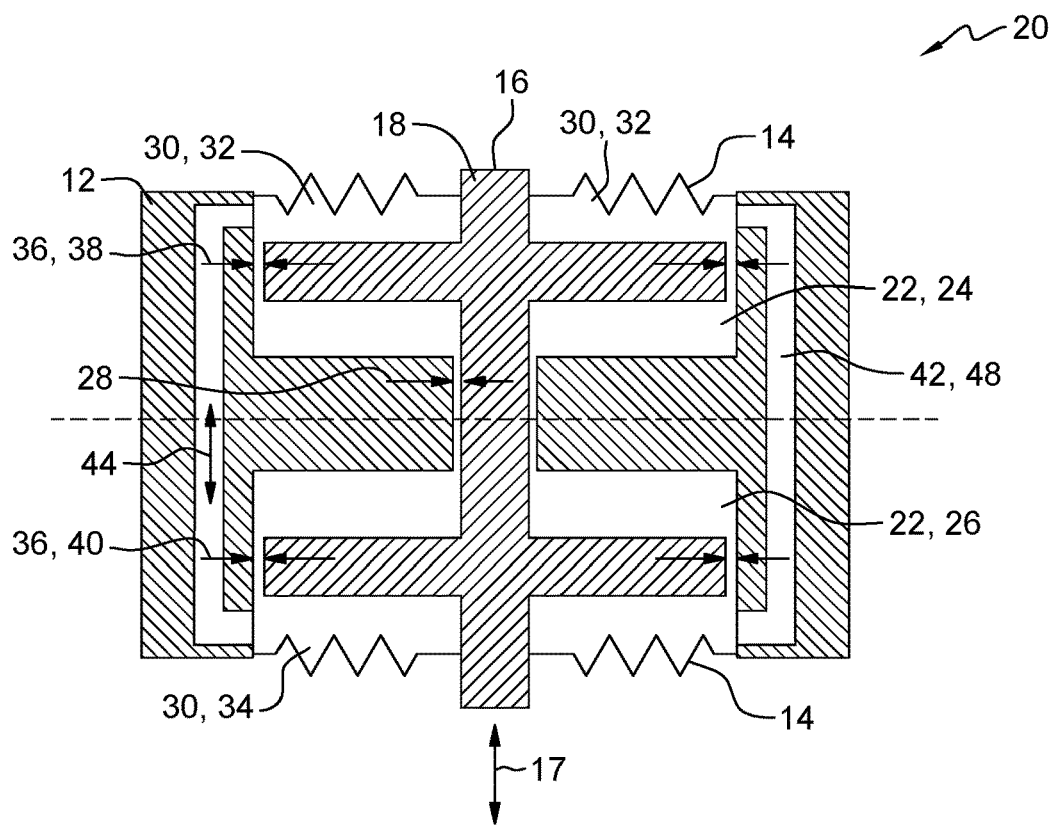
FIG. 3 is a schematic cross-section of another embodiment of a frequency independent HSFD, in accordance with one or more embodiments of the present disclosure.

After impinging the turbine blade assembly 134, thermal energy is converted to mechanical rotational energy that is used to the drive rotor assembly 120. The turbine section 112 drives the compressor section 104 and/or the load 126 via the drive shaft 122, and exhaust gases 156 are discharged through the exhaust section 118 to ambient atmosphere. The bearing assemblies 160 facilitate rotation of the rotor assembly 120 and dampen vibrational energy imparted to the bearing assemblies 160 during operation of the turbomachine 100. Although the bearing assemblies 160 are described and illustrated as being located within the compressor casing 106 and the turbine casing 114, the bearing assemblies 160 may be located at any desired location along the shaft 122 including, but not limited to, a central or mid-span region of the shaft 122, or other locations along the shaft 122 where the use of conventional bearing assemblies would present significant design challenges Referring now to FIGS. 2 and 3, illustrated in schematic axial cross-sectional views, are embodiments of a portion of a bearing assembly, generally similar to bearing assembly 160 of FIG. 1, and more particularly, a frequency independent damper, referenced 10 and 20, respectively. It should be noted that components in FIGS. 2 and 3 that are identical are identified using the same reference numerals.

Each of the frequency independent damper assemblies 10, 20, includes a stationary annular damper housing 12. The stationary annular damper housing 12 provides support to a plurality of flexible elements 14 and is the structure that reacts to damping and stiffness forces generated in the damper support, and more particularly, the stationary damper housing 12. As best illustrated in FIG. 2, the flexible elements 14 may be disposed substantially parallel to a central post (described presently). As best illustrated in FIG. 3, the flexible elements may be disposed substantially perpendicular to the central post. The moving central post 16 transmits an externally imposed vibration to a damper plunger 18, which then modulates a plurality of cavity volumes (described presently) within the frequency independent damper 10, 20. As illustrated in FIGS. 2 and 3, varying plunger designs may be utilized in the damper assembly.

The frequency independent damper 10, 20 includes two opposing primary damper cavities 22, and more particularly, a first primary damper cavity 24, and a second primary damper cavity 26. The first primary damper cavity 24, and the second primary damper cavity 26 are in fluid communication via a primary damper cavity clearance 28. As the primary damper cavity volumes 22 are modulated through vibratory motion transferred from the central post 16, as best illustrated by directional arrow 17, fluid flow is created and forced through the primary damper cavity clearance 28 generating viscous energy dissipation; the mechanism responsible for damping.

In contrast to known damper assemblies, to ensure that the frequency independent damper 10, 20 generates frequency independent stiffness and damping coefficients, the flexible elements 14 are located radially outward of the primary damper cavities 22 where there are high dynamic pressures generated. The flexible elements 14 contain the hermetic damper fluid while allowing motion of the central post 16 and the damper plunger 18. The flexible elements 14 define a plurality of accumulator volumes 30, and more particularly, a first accumulator cavity 32 and a second accumulator cavity 34. The first accumulator cavity 32 and the second accumulator cavity 34 are thus defined radially outward of the primary damper cavities 22 and fluidically decoupled from the primary damper cavities 22 through a plurality of restrictive clearances 36, and more particularly, via a first accumulator clearance 38 and a second accumulator clearance 40.

The frequency independent damper assemblies 10, 20 further includes at least one non-restrictive pass-through channel 42 to provide for a reciprocating flow, as indicated by directional arrow 44, between the first accumulator cavity 32 and the second accumulator cavity 34. The at least one non-restrictive pass-through channel 42 may be configured as a single pass-through channel 46 located at the central post 16, as best illustrated in FIG. 2, or configured as a plurality of pass through channels 48 disposed circumferentially about a diameter of the frequency independent damper assembly 20, as best illustrated in FIG. 3.

Figure 4:
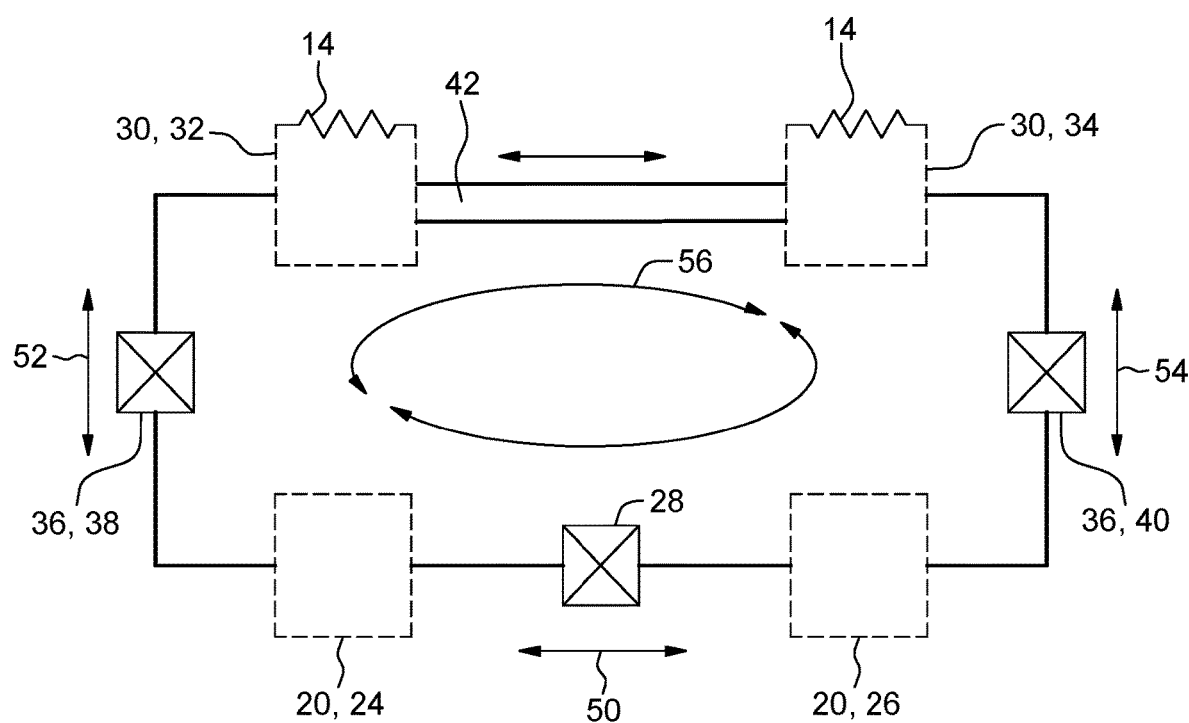
FIG. 4 is a schematic flow diagram of the frequency independent HSFD of FIG. 2, in accordance with one or more embodiments of the present disclosure.

Referring now to FIG. 4, illustrated is a high-level flow diagram, illustrating how the basic components of the frequency independent damper, such as the frequency independent damper 10, 20 described in FIGS. 2 and 3, are linked from a fluid flow perspective. In FIG. 4, the two primary damper cavities 22, and more particularly the first primary damper cavity 24 and the second primary damper cavity 26, are illustrated by dotted line. The dotted lines throughout FIG. 4, represent rigid (non-flexible) but movable boundaries. The two primary damper cavities 22 are fluidically coupled to each other through the primary damper cavity clearance 28, that provides for a restricted flow 50 between the first primary damper cavity 24 and the second primary damper cavity 26. The two accumulator cavity volumes 30, and more particularly, the first accumulator cavity 32 and the second accumulator cavity 34, are bounded by a combination of rigid (dotted line) elements and flexible (solid zig-zag lines) elements, such as flexible elements 14 of FIGS. 2 and 3. The accumulator volumes 30 are separated from the primary damper cavity volumes 22 through another set of restrictive clearances 36. More particularly, the first accumulator cavity 32 is fluidically decoupled from the first primary damper cavity 24 via the first accumulator clearance 38, that provides for a restricted flow 52. The second accumulator cavity 34 is fluidically decoupled from the second primary damper cavity 24 via the second accumulator clearance 40, that provides for a restricted flow 54. The two accumulator cavity volumes 30, and more particularly, the first accumulator cavity 32 and the second accumulator cavity 34, are fluidically coupled through the non-restrictive pass-through channel 42. In combination, the elements of the frequency independent damper 10, 20 generate an oscillating-recirculating flow 56 when external vibratory motion, as described with reference to FIGS. 2 and 3, is imposed on the system.

Figure 5:
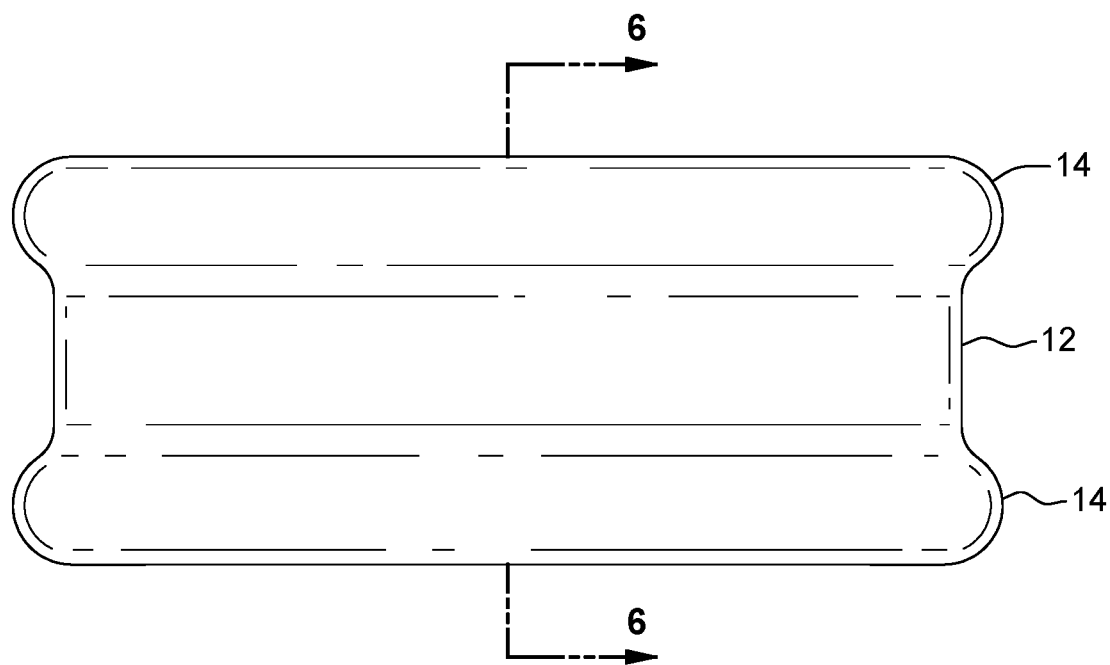
FIG. 5 is a schematic exterior view of an embodiment of an additively manufactured frequency independent HSFD, in accordance with one or more embodiments of the present disclosure.
Figure 6:
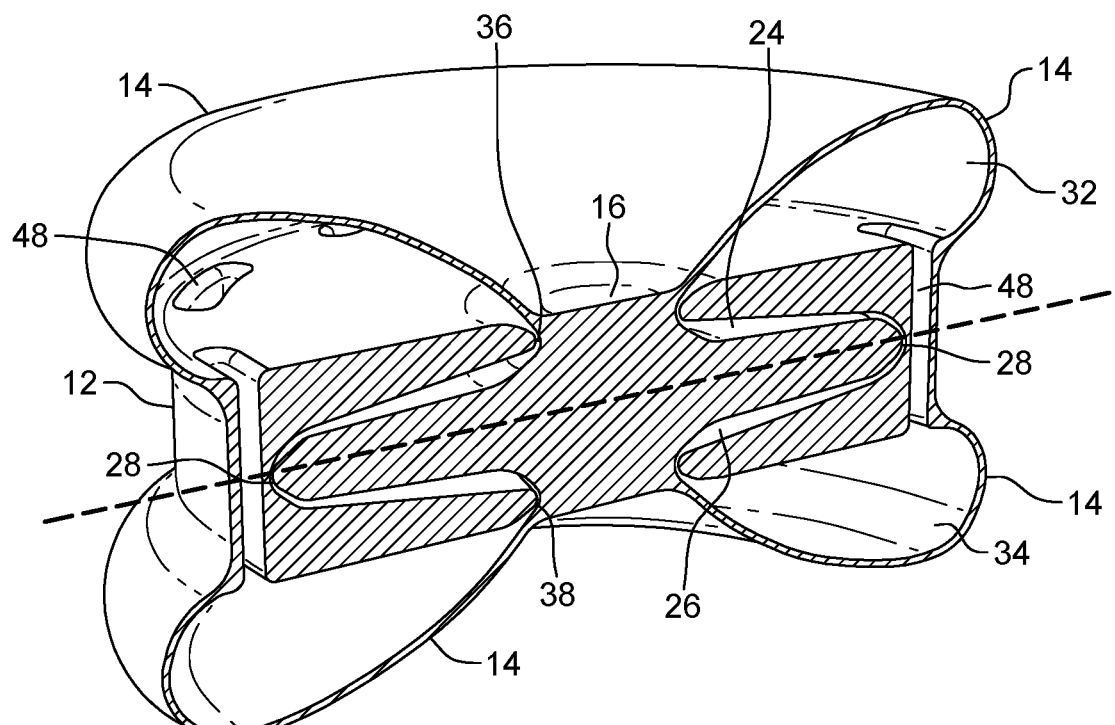
FIG. 6 is a schematic isometric of the additively manufactured frequency independent HSFD of FIG. 5, in accordance with one or more embodiments of the present disclosure.

Referring now to FIGS. 5 and 6, illustrated is a schematic side view (FIG. 5) and an axial cross-sectional view (FIG. 6) taken through line 6-6 of FIG. 5, of an exemplary frequency independent damper assembly 60, generally similar to the damper assembly 20 of FIG. 3, in accordance with one or more embodiments of the present disclosure. In this particular embodiment, the frequency independent damper assembly 60 is fabricated using additive manufacturing techniques, resulting in a single integral design. It should be noted that components in FIGS. 5 and 6 that are identical to those previously described in FIG. 3, are identified using the same reference numerals.

In the illustrated embodiment of FIGS. 5 and 6, the frequency independent damper assembly 60 may generally comprise a stationary damper housing 12. The stationary damper housing 12 provides support to a plurality of flexible elements 14. The moving central post 16 transmits an externally imposed vibration to a damper plunger 18, which then modulates a plurality of cavity volumes (described presently) within the frequency independent damper 10, 20.

The frequency independent damper 60 includes a first primary damper cavity 24, and a second primary damper cavity 26 in fluid communication via a primary damper cavity clearance 28. As the primary damper cavity volumes 24, 26 are modulated through vibratory motion transferred from the central post 16, fluid flow is created and forced through the primary damper cavity clearance 28 generating viscous energy dissipation, and more specifically, damping.

As previously described, to ensure that the frequency independent damper 60 generates frequency independent stiffness and damping coefficients, the flexible elements 14 are located radially outward of the first and second primary damper cavities 24, 26 where there are high dynamic pressures generated. The flexible elements 14 define a first accumulator cavity 32 and a second accumulator cavity 34. The first accumulator cavity 32 and the second accumulator cavity 34 are fluidically decoupled from the first and second primary damper cavities 24, 26 via a first accumulator clearance 34 and a second accumulator clearance 36, respectively.

The frequency independent damper assembly 60 further includes a plurality of non-restrictive pass-through channels 48 to provide for a reciprocating flow between the first accumulator cavity 32 and the second accumulator cavity 34. The plurality of non-restrictive pass-through channel 48 are configured as a plurality of pass through channels 48 circumferentially spaced about a diameter of the frequency independent damper assembly 60.

Figure 7:
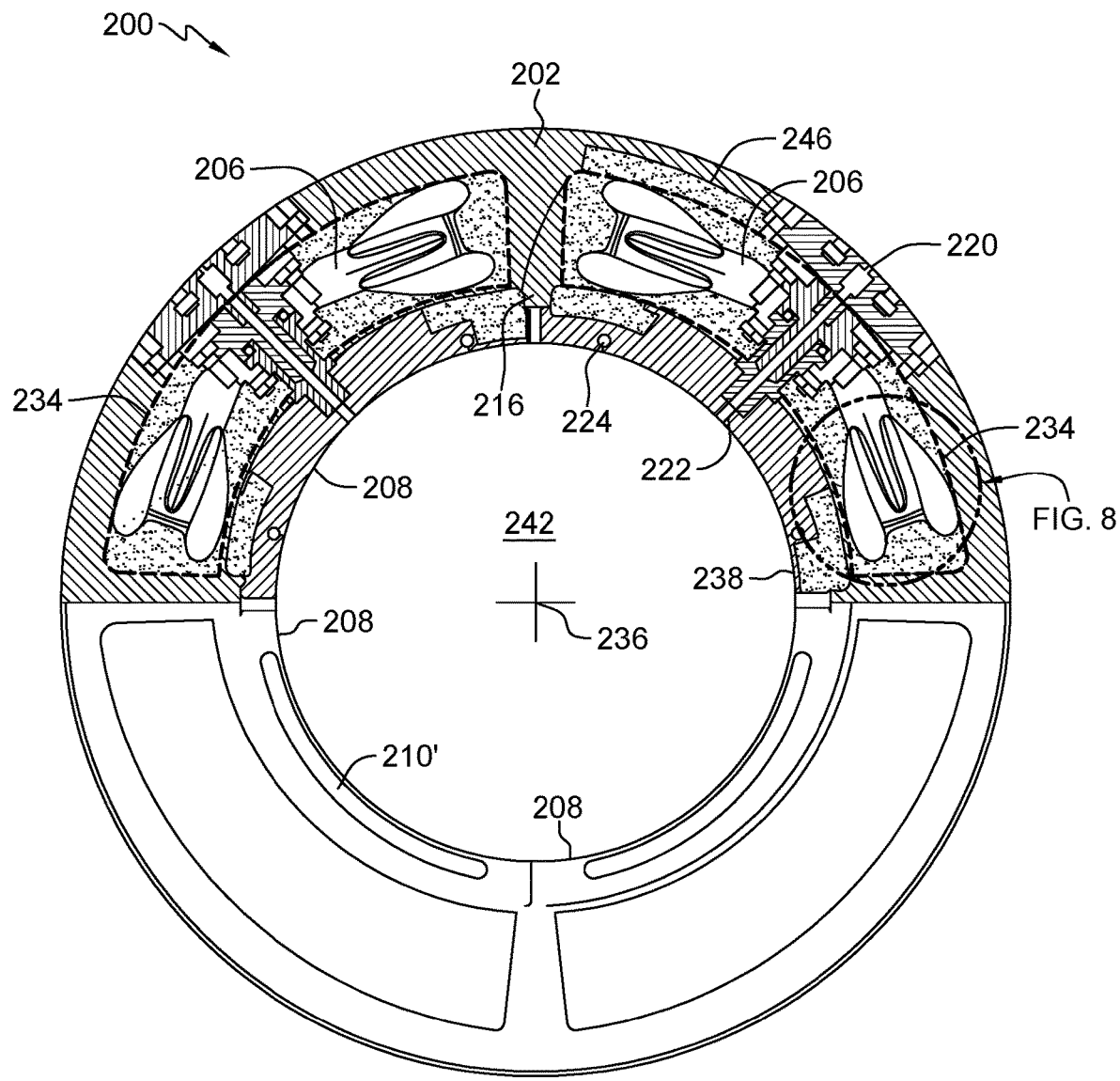
FIG. 7 is an axial cross-sectional view of another embodiment of gas bearing of a rotary machine, including a bearing support, in accordance with one or more embodiments of the present disclosure.

Referring now to FIG. 7, illustrated is an axial cross-sectional view of an exemplary gas bearing assembly 200, generally similar to the gas bearing 160, of the rotary machine 100 of FIG. 1, including a frequency independent damper assembly, in accordance with one or more embodiments of the present disclosure. In some embodiments, the bearing 200 may generally comprise an outer rim 202, a housing 216, a plurality of bearing pads 208 and a plurality of frequency independent damper assemblies, in accordance with embodiments disclosed here, (indicated generally at 234 of FIG. 2).

The bearing pads 208 are symmetrically arranged about a central axis 236 of the bearing assembly 200 and define an annular inner surface 238 that is configured to support a rotatable shaft (e.g. shaft 122 of FIG. 1). In some embodiments, each bearing pad 208 is adapted to receive a working gas (e.g., air, compressed air and combustion gases, or the like) from a gas inlet 220, and disperse and/or diffuse the gas to support and/or lubricate the shaft during operation of the turbomachine, thereby providing a hydrostatically pressurized compliant bearing pad 208. For example, in some embodiments, each bearing pad 208 has a sufficiently high gas permeability to permit the gas received via the gas inlet (not shown) to generate sufficient pressure within an interior cavity 242 to provide the support and/or lubrication of the shaft 122. Alternatively, or in combination, in some embodiments, the bearing pad 208 may include a plurality of gas distribution holes 224 disposed across the bearing pad 208 to provide an evenly distributed pressure field within the interior cavity 242 for supporting and/or lubricating the shaft. In such embodiments, the plurality of gas distribution holes 224 may be fluidly coupled to one or more plenums 222 to facilitate even distribution of the gas. In embodiments where the one or more plenums 222 are present, a bearing pad sealing plate 210 may be coupled to the bearing pad 208 to seal the one or more plenums 222.

The plurality of gas distribution holes 224 may be configured having any dimensions or arrangements (e.g., array, pattern or configuration) suitable to function as described herein. For example, in some embodiments, the plurality of gas distribution holes 224 may generally have a diameter in the range of between about 2 mils (about 50 micrometers) and about 100 mils (about 2,540 micrometers) and, more specifically, between about 5 mils (about 127 micrometers) and about 20 mils (about 508 micrometers).

The bearing pads 208 may be fabricated from any material suitable to withstand the working conditions of the bearing assembly 200. In addition, in some embodiments, the bearing pad 208 is fabricated form a material having a sufficiently low porosity to prevent instabilities in the thin gas film created between bearing pads 208 and shaft during operation of the turbomachine. For example, in some embodiments, the bearing pads 208 may be fabricated from porous carbons, such as carbon graphite, sintered porous ceramics, and sintered porous metals, such as Inconel® and stainless steel.

Figure 8:
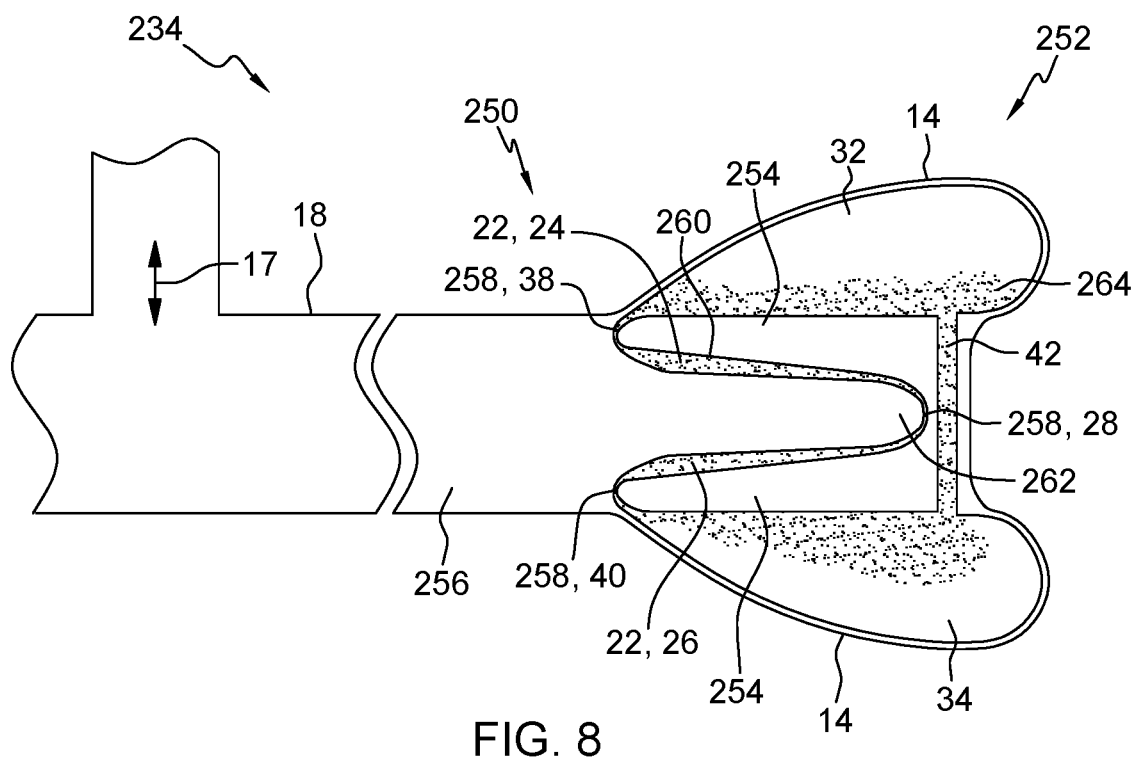
FIG. 8 is an enlarged axial cross-sectional view of a portion of the bearing support of FIG. 8, in accordance with one or more embodiments of the present disclosure.
Figure 9:
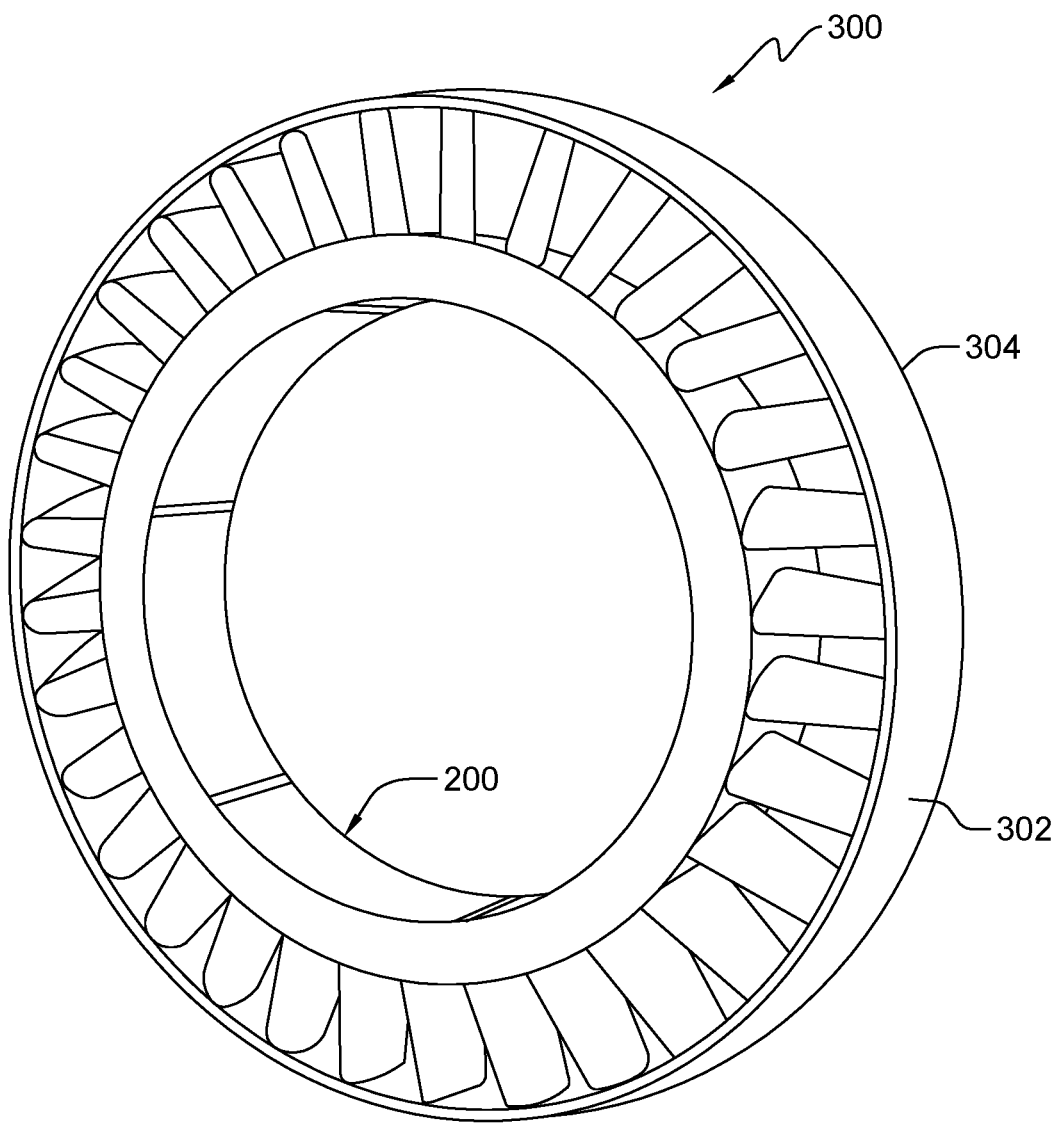
FIG. 9 is a simplified turbine nozzle including an exemplary gas bearing, in accordance with one or more embodiments of the present disclosure.

Referring more specifically to FIG. 8, a portion of the damper assembly 234 of FIG. 7 is illustrated. It should be noted that components in FIG. 8 that are identical to those previously described with regard to the damper assembly of FIGS. 2 and 3, are identified using the same reference numerals. The damper assembly 234 generally comprises a damper 250 and a support spring 252. In the illustrated embodiment, the damper 250 includes a damper plunger 18 having stiff/rigid walls (thick arms) referred to herein as a damper platform 254 defining a primary damper cavity 22, and a plunger platform 256, extending into the primary damper cavity, to define a first primary damper cavity 24 and a second primary damper cavity 26. As previously described, in an alternate embodiment, the primary damper cavity 22 may be defined by a portion of the damper housing. The damper platform 254 is designed to not deflect during operation.

The support spring 252 is defined by an accumulator volume 30, and more particularly a first or upper accumulator cavity 32 and a second or lower accumulator cavity 34, connected by a pass-through channel 42. Each of the first and second accumulator cavities 32, 34 is defined by a flexible element 14 and the respective damper platform 254. The accumulator volume 30 is configured to bound the primary damper cavity 22 and has a low dynamic pressure. The pass-through channel 42 couples the first accumulator cavity 32 and the second accumulator cavity 34 and maintains a low dynamic pressure within the first and second accumulator cavities 32, 34. The damper plunger 18 is disposed within a cavity 246 (FIG. 8) formed within the housing 216 and coupled to the housing 216. The damper platform 254 supports the damper plunger 18. The damper plunger 18, and more particularly, a plunger platform 256 separates the primary damper cavity 22 into a first primary damper cavity 24 and a second primary damper cavity 26 and forms a plurality of resistive flow paths 258 between the first primary damper cavity 24 and the second primary damper cavity 26 and the first accumulator cavity 32 and the second accumulator cavity 34, respectively. These three critical clearances, and more particularly, the resistive flow paths 258 are incorporated to manage and control the bearing support fluid.

In an embodiment, an unoccupied portion of the cavity 246 (FIG. 8) is filled with a non-compressible, viscous fluid and is hermetically sealed via a sealing plate (not shown). The fluid may be any non-compressible, viscous fluid suitable for the particular operating environment. For example, in some embodiments, the fluid may be an oil-based fluid, a liquid metal (broadly, a metallic fluid), or the like.

In the exemplary embodiment, the primary damper cavity 22, and more particularly, each of the first primary damper cavity 24 and the second primary damper cavity 26 are bounded by the structure of the damper platform 254 and the plunger platform 256 of the plunger 18, each having a high stiffness coefficient (rigid). Although shown as a single integrally formed component, in some embodiments the damper plunger 18 may be a multicomponent part. Providing the damper plunger 18 as a single integrally formed component facilitates a reduction in parts of the bearing 200, thereby further reducing the cost, complexity, size and weight of the bearing 200. Any suitable fabrication technique may be utilized to create the components of the bearing 200, for example such as the EDM or additive manufacturing techniques described above.

As previously described, the damper plunger 18 separates the primary damper cavity 22 into the first primary damper cavity 24 and the second primary damper cavity 26. The damper plunger 18 and primary damper cavity 22 are dimensioned relative to one another to provide a predetermined clearance between the damper plunger 18 and a primary damper cavity wall 260, defined by the damper platform 254, to form the resistive flow paths 258. A first resistive flow path, and more particularly a primary damper cavity clearance 28 is defined between an end 262 of the plunger platform 256 and the cavity wall 260 of the damper platform 254 to define the first primary damper cavity 24 and the second primary damper cavity 26. A second resistive flow path, and more particularly, a first accumulator cavity clearance 38 is defined between the plunger platform 256 and the cavity wall 260 of the damper platform 254, between the first primary damper cavity 24 of the primary damper cavity 22 and the first accumulator cavity 32. A third resistive flow path, and more particularly, a second accumulator cavity clearance 40 is defined between the plunger platform 256 and the cavity wall 260 of the damper platform 254, between the second primary damper cavity 26 of the primary damper cavity 22 and the second accumulator cavity 34.

In operation, when a force (e.g., a vibrational force 17 caused by rotation of a shaft) is applied to the bearing pad 208 (FIG. 8), a relative motion between the damper plunger 18 and the housing 216 (FIG. 8) occurs. Such a motion causes a fluid 264 to be forced through the resistive flow paths 258 between the first accumulator cavity 32 and the first primary damper cavity 24, the first primary damper cavity 24 and the second primary damper cavity 26, and the second primary damper cavity 26 and the second accumulator cavity 34. Due to a dash-pot effect of the fluid 264 (resistance to motion) an energy of the force is dissipated, thereby damping the force.

The inventor has observed that the above frequency independent bearing 200 may further allow the bearing 200 to be utilized in unconventional locations and/or integrations throughout a turbomachine without disrupting an existing cross section, length or architecture of the turbomachine. Such utilization of the inventive bearing 200 may advantageously benefit engine operation due to reduced clearance closures during maneuver of loads, ability to engineer loner rotor bearing systems with additional stages, reduction in dynamic bearing and structural loads, reduction in synchronous vibration response, and improved stability.

For example, in some embodiments, the bearing 200 may be integrated into a turbine nozzle 300 of an aircraft engine, such as shown in FIG. 10. In such embodiments, guide vanes 302 of the nozzle 300 may be disposed between, and supported by, the housing 116 (FIG. 8) of the bearing 200 and an outer ring 304 of the turbine nozzle 300.

Thus, embodiments of a bearing including a bearing support employing first and second accumulator volumes defined by flexible elements that are disposed radially outward of a primary damper cavity, and wherein the first and second accumulator cavities are connected with a pass-through channel has been provided herein. By using an active control in the primary damper cavity to adjust a dynamic volume change, damping and stiffness coefficients are frequency independent. The disclosed bearing design provides high speed stable operation of rotors in high performance turbomachinery. The design further provides for lubricating main shaft bearings with the process fluid which in turn simplifies design leading to cost reduction and also has performance benefits due to reduction in bearing power loss (heat gen). The novel bearing advantageously incorporates a bearing support including an accumulator volume, defined by flexible elements that do not bound the primary damper cavity as compared to conventional gas bearings.

Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This written description uses examples to disclose the invention, including the best mode, and to enable any person skilled in the art to practice the invention, including making and using any devices or systems and performing any incorporated methods. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims. Such other examples are intended to be within the scope of the claims if they include structural elements that do not differ from the literal language of the claims, or if they include equivalent structural elements with insubstantial differences from the literal languages of the claims.

What is claimed is:

1. A frequency independent damper assembly of a gas bearing, comprising:
   a damper housing;
   a damper plunger disposed at least partially within the damper housing, wherein the damper plunger defines a first primary damper cavity and a second primary damper cavity within the damper housing;
   a support spring comprising a plurality of flexible elements coupled to the damper housing, the support spring defining a first accumulator cavity and a second accumulator cavity, the flexible elements disposed radially outward of the first primary damper cavity and a second primary damper cavity; and
   at least one flow-through channel coupling the first accumulator cavity to the second accumulator cavity.

2. The frequency independent damper assembly as claimed in claim 1, further comprising a moving central post to transmit an externally imposed vibration to the damper plunger, which then modulates the first primary damper cavity and the second primary damper cavity.

3. The frequency independent damper assembly as claimed in claim 2, wherein the plurality of flexible elements are disposed substantially perpendicular to the moving central post.

4. The frequency independent damper assembly as claimed in claim 2, wherein the plurality of flexible elements are disposed substantially parallel to the moving central post.

5. The frequency independent damper assembly as claimed in claim 1, wherein the first primary damper cavity and the second primary damper cavity are in fluid communication via a primary damper cavity clearance.

6. The frequency independent damper assembly as claimed in claim 1, further comprising a plurality of restrictive clearances fluidically decoupling the first accumulator cavity and the second accumulator cavity from the first primary damper cavity and the second primary damper cavity.

7. The frequency independent damper assembly as claimed in claim 6, wherein the plurality of restrictive clearances comprise a first accumulator clearance fluidically decoupling the first primary damper cavity and the first accumulator cavity and a second accumulator clearance fluidically decoupling the second primary damper cavity and the second accumulator cavity.

8. The frequency independent damper assembly as claimed in claim 1, wherein the at least one flow-through channel coupling the first accumulator cavity to the second accumulator cavity comprises at least one non-restrictive flow-through channel.

9. The frequency independent damper assembly as claimed in claim 8, wherein the at least one non-restrictive pass-through channel is a single pass-through channel located at the central post.

10. The frequency independent damper assembly as claimed in claim 8, wherein the at least one non-restrictive pass-through channel comprises a plurality of pass-through channels disposed circumferentially about a diameter of the frequency independent damper assembly.

11. A bearing, comprising:
    an outer rim;
    a housing; and a frequency independent damper assembly, comprising:
  a damper housing;
  a damper plunger disposed at least partially within the damper housing, wherein the damper plunger defines a first primary damper cavity and a second primary damper cavity within the damper housing;
  a support spring comprising a plurality of flexible elements coupled to the damper housing, the support spring defining a first accumulator cavity and a second accumulator cavity, the flexible elements disposed radially outward of the first primary damper cavity and a second primary damper cavity; and
  a non-restrictive flow-through channel coupling the first accumulator cavity to the second accumulator cavity.

12. The bearing as claimed in claim 11, further comprising a moving central post to transmit an externally imposed vibration to the damper plunger, which then modulates the first primary damper cavity and the second primary damper cavity.

13. The bearing as claimed in claim 12, wherein the plurality of flexible elements are disposed one of substantially perpendicular to the moving central post or substantially parallel to the moving central post.

14. The bearing as claimed in claim 11, wherein the first primary damper cavity and the second primary damper cavity are in fluid communication via a primary damper cavity clearance.

15. The bearing as claimed in claim 11, further comprising a plurality of restrictive clearances fluidically decoupling the first accumulator cavity and the second accumulator cavity from the first primary damper cavity and the second primary damper cavity.

16. The bearing as claimed in claim 15, wherein the plurality of restrictive clearances comprise a first accumulator clearance fluidically decoupling the first accumulator cavity and the first primary damper cavity and a second accumulator clearance fluidically decoupling the second accumulator cavity and the second primary damper cavity.

17. The bearing as claimed in claim 11, wherein the at least one non-restrictive pass-through channel is a single pass-through channel located at the central post.

18. The bearing as claimed in claim 11, wherein the at least one non-restrictive pass-through channel comprises a plurality of pass-through channels disposed circumferentially about a diameter of the frequency independent damper assembly.

19. The bearing as claimed in claim 18, wherein the plurality of restrictive clearances comprise a first accumulator clearance fluidically decoupling the first accumulator cavity and the first primary damper cavity and a second accumulator clearance fluidically decoupling the second accumulator cavity and the second primary damper cavity.

20. A bearing, comprising:
  an outer rim;
  a housing; and
  a frequency independent damper assembly, comprising:
    a damper housing;
    a damper plunger disposed at least partially within the damper housing, wherein the damper plunger defines a first primary damper cavity and a second primary damper cavity within the damper housing, wherein the first primary damper cavity and the second primary damper cavity are in fluid communication via a primary damper cavity clearance;
    a support spring comprising a plurality of flexible elements coupled to the damper housing, the support spring defining a first accumulator cavity and a second accumulator cavity, the flexible elements disposed radially outward of the first primary damper cavity and a second primary damper cavity;
    a non-restrictive flow-through channel coupling the first accumulator cavity to the second accumulator cavity; and
    a plurality of restrictive clearances fluidically decoupling the first accumulator cavity and the second accumulator cavity from the first primary damper cavity and the second primary damper cavity.

* * * * *